United States Patent [19]

Fentress

[11] 4,426,413
[45] Jan. 17, 1984

[54] HEAT-RECOVERABLE CLOSURE ASSEMBLY

[75] Inventor: Vernon A. Fentress, Foster City, Calif.

[73] Assignee: Raychem Corporation, Menlo Park, Calif.

[21] Appl. No.: 376,073

[22] Filed: May 7, 1982

Related U.S. Application Data

[63] Continuation of Ser. No. 155,817, Jun. 2, 1980, abandoned.

[51] Int. Cl.³ .................. H02G 13/06; H01R 3/00
[52] U.S. Cl. .................. 428/36; 174/84 R; 174/DIG. 8; 339/213 R; 339/DIG. 1; 156/49; 156/86
[58] Field of Search ............ 428/36; 174/84 R, 88 R, 174/91, 92, 93; 339/208, 213 R, DIG. 1; 156/49, 86

[56] References Cited

U.S. PATENT DOCUMENTS

| | | | |
|---|---|---|---|
| 3,466,384 | 9/1969 | Martin | 174/92 |
| 3,573,346 | 4/1971 | Appleby | 174/93 |
| 3,875,325 | 4/1975 | Anderson | 174/92 |
| 3,879,574 | 4/1975 | Filreis et al. | |
| 3,891,790 | 6/1975 | Kierstead | 174/DIG. 8 |
| 3,955,043 | 5/1976 | Palmer | 174/84 R |
| 4,029,895 | 6/1977 | Scarborough | 174/84 R |
| 4,142,592 | 3/1979 | Brusselmans | 174/92 |
| 4,233,731 | 11/1980 | Clabburn et al. | 174/DIG. 8 |
| 4,276,909 | 7/1981 | Biscop . | |
| 4,283,239 | 8/1981 | Corke et al. . | |
| 4,304,616 | 12/1981 | Richardson . | |
| 4,380,686 | 4/1983 | Moisson | 174/84 R |

FOREIGN PATENT DOCUMENTS

| | | |
|---|---|---|
| 2807154 | 11/1979 | Fed. Rep. of Germany . |
| 614477 | 12/1948 | United Kingdom . |
| 1065431 | 4/1967 | United Kingdom . |
| 1586388 | 3/1981 | United Kingdom . |
| 1603626 | 11/1981 | United Kingdom . |
| 1604982 | 12/1981 | United Kingdom . |

OTHER PUBLICATIONS

Ser. No. 228,349 Franckx filed 1/26/81.

Primary Examiner—William R. Dixon, Jr.
Attorney, Agent, or Firm—Edith A. Rice; Herbert G. Burkard

[57] ABSTRACT

A heat-recoverable closure assembly for enclosing e.g. cable splices comprising a heat-recoverable outer sleeve surrounding a body to be enclosed thereby, a support member surrounding the body and within the sleeve which support member has slotted end portions arranged to be capable of forming a tapering transition from the support member to the body, and a flexible barrier layer bridging the slots of the slotted portions. The barrier may act to seal the slots against ingress of moisture or heat, and the barrier layer preferably covers substantially all of one surface of the support. Foamed polymer layers are particularly suitable as heat barriers, and metallic layers carried on a flexible carrier are particularly suitable as moisture barriers. The barrier may be inside or outside the support member, to suit end use requirements. A heat barrier will normally be placed outside the support member when the latter is made of thermoplastic material.

11 Claims, 6 Drawing Figures

U.S. Patent  Jan. 17, 1984  4,426,413
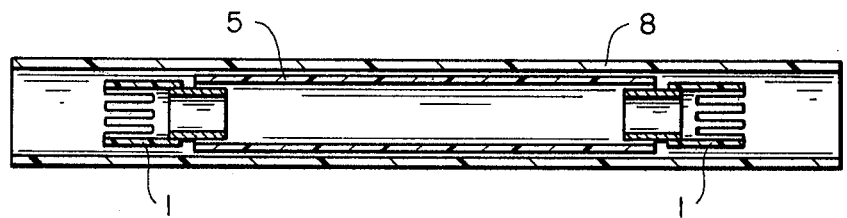
FIG_1
PRIOR ART
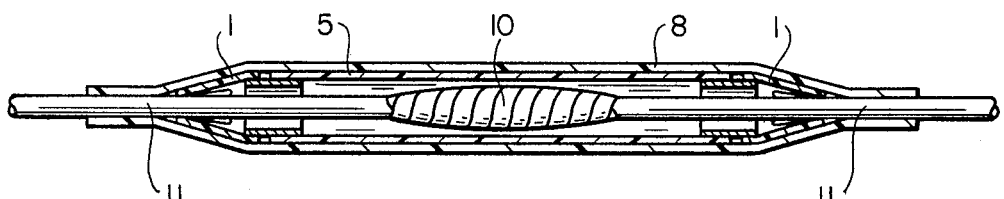
FIG_2
PRIOR ART
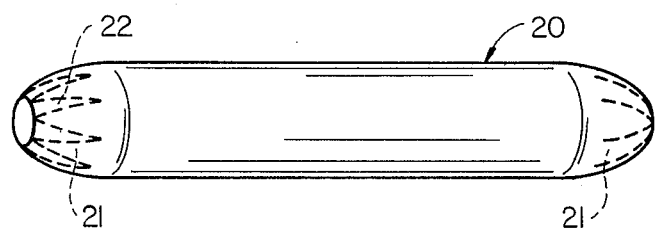
FIG_3
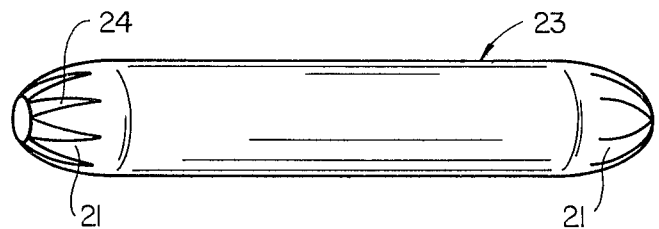
FIG_4
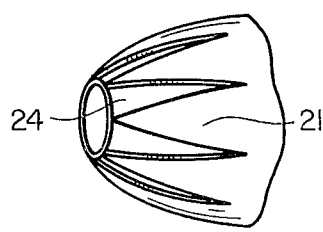
FIG_4A
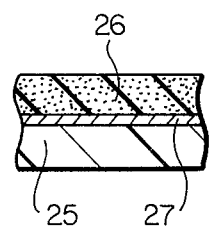
FIG_5

HEAT-RECOVERABLE CLOSURE ASSEMBLY

This is a continuation of application Ser. No. 155,817, filed June 2, 1980, now-abandoned.

DESCRIPTION OF THE INVENTION

This invention relates to a heat-recoverable closure assembly for enclosing cable splices, to a support member or liner for use in such an assembly, and to a method of enclosing a body using such an assembly, and cable splices enclosed thereby.

U.S. Pat. No. 4,142,592 describes an assembly for protecting and insulating cable splices wherein a heat-recoverable sleeve is shrunk down over a tubular support member which surrounds the spliced cable and has flexible prongs or fingers at its ends which can be deformed towards the cable to provide a tapered transition from the support member to the cable surface. In that U.S. patent, the fingers are provided in end pieces which fit into the generally tubular body of the support member, but the fingers and support member body could be integrally formed if desired. The present invention can be used to improve the moisture resistance and heat-resistance of such closure assemblies.

One aspect of the present invention accordingly provides a heat-recoverable closure assembly comprising a heat-recoverable outer sleeve surrounding a body to be enclosed thereby, a support member surrounding the body and within the sleeve which support member has slotted end portions arranged to be capable of forming a tapering transition from the support member to the body, and a flexible barrier layer associated with at least the slotted portions of the support member and bridging the slots thereof. The flexible barrier layer may cover substantially all of one major surface of the support member as well as bridging the slots of the slotted portions.

The barrier layer may be a moisture barrier, for which purpose a metallic layer carried on a flexible carrier member is preferred, or the barrier may be a heat barrier, for which purpose flexible foam sheet is preferred. Both of these purposes may be served by a barrier comprising a metallic layer laminated with a flexible foam sheet.

The barrier layer may be inside or outside the support member as installed around the body to be enclosed, according to end use requirements, and it will be understood that the use of a heat barrier outside the support member is preferred when thermoplastic support members are to be used, the heat barrier then being arranged substantially to prevent thermal deformation of the support member during heat recovery of the sleeve. Preferably, the barrier layer will cover substantially the whole of a major surface of the support.

Metal supports, as known per se, can benefit from the present invention by virtue of reduced heat build up within the metal support sleeve during recovery of the heat-recoverable sleeve, and by reduced ingress of moisture at the slotted end portions. Thermoplastic supports can be used to provide relatively inexpensive closures, which nevertheless can have sufficient strength for use in forming cable splice enclosures of up to 300 mm diameter, polypropylene being a preferred thermoplastic material for the support, and flexible foams of suitably high melting point, such as neoprene foam or cross-linked polyolefin foam being preferred as the heat barrier layer for such thermoplastic supports.

The support and the barrier layer may be laminated together, convenient materials such as adhesives and convenient techniques being readily selected by a person familiar with such technology, and the resulting laminate may also include other layers. For example it may comprise the support, a vapour impermeable moisture barrier layer and a foam heat barrier layer. In the latter case, the moisture barrier layer may be sandwiched between the foam and the support, or may be carried on the outer surface of the foam. Other arrangements may also be used according to need. For example, the moisture barrier layer could be carried on the inner surface of the heat-recoverable sleeve, which can then receive the usual coating of heat activatable adhesive or sealant.

The support may be a flexible metal shield, or may comprise hinged segments of substantially rigid metal, and it will be understood that the support may have score lines or indentations in its surface arranged to facilitate wrapping around the body, such as a cable splice, to be protected.

In use, when the support is placed around the body to be protected and the slotted end portions or fingers are tapered down on to the body in question, e.g. to form a tapered transition from the support member to a cable surface, the barrier layer, being flexible, folds so as not to hinder the tapering of the fingers, while maintaining a barrier action by virtue of its bridging the slots. The assembly of the present invention is thus surprisingly versatile and can be advantageously adapted to improve the end result in a variety of working environments.

Embodiments of the invention will now be described in more detail with reference to the accompanying drawings wherein:

FIG. 1 shows a closure assembly of known type having a heat-recoverable sleeve 8 surrounding a support member 5 with slotted end portions 1;

FIG. 2 shows the assembly of FIG. 1 installed around a cable splice 10 with the sleeve 8 recovered on to the support 5 and the slotted end portions 1 tapered on to the surface of the cable 11;

FIG. 3 shows a support member 20 according to the present invention with the slotted portions 21 formed integrally therewith, and the barrier layer 22 on the outside thereof and covering not only the slotted end portions but substantially all of the outer surface of the support, which support is wrapped as it would be when placed around a body such as a cable;

FIG. 4 shows a support member according to the present invention which is similar to that shown in FIG. 3, except that the barrier layer 22 is inside the support;

FIG. 4a shows a magnified detail of the support shown in FIG. 4, with the vapor barrier 22 clearly bridging the slots between the fingers 21; and FIG. 5 illustrates a preferred laminated structure for the support comprising a thermoplastic layer 25 and a foamed polymeric layer 26 between which layers is sandwiched a flexible vapor barrier metallic layer 27.

Referring now to the drawings, FIGS. 3 and 4 show how the principle of the present invention can be applied to supports such as the support 5 shown in FIGS. 1 and 2, since it is immaterial to the present invention whether or not the fingers are formed integrally with the body of the support.

FIG. 3 shows a cable sleeve liner 20 comprising a support of calcium carbonate filled polypropylene having slotted end portions arranged to form fingers 21 integrally with the body of the support, and a thermal barrier layer 22 of foamed neoprene (alternatively foamed cross-linked polyethylene) having sufficient heat resistance to avoid melting at temperatures encountered with the closure assembly in operation. The foam is flexible and bridges the slots between fingers 21 so as to provide a continuous barrier, and may be laminated with a vapor barrier layer (not shown) e.g. a metallic layer, to enhance the moisture resistance of the assembly. The construction shown in FIG. 5 comprising thermoplastic support 25, metallic vapor barrier 27 and foam thermal barrier layer 26 could be used in this connection.

FIG. 4 shows a cable sleeve liner 23 which is made of metal (or other material which is substantially infusible at temperatures encountered in use) and has an internal moisture barrier layer 24 bridging the slots between fingers 21. This moisture barrier layer could, of course, cover the whole internal surface of the support if the support material has any significant degree of moisture vapor permeability. The vapor barrier is a metallic coating carried on a flexible sheet, and the flexible sheet may be the aforementioned foam if it is desired to enhance the thermal insulation of the assembly. The construction of FIG. 5 would again be suitable (but in reverse order from inside to outside) provided that the material of support 25 were capable of withstanding the temperatures encountered in use without an external thermal barrier layer.

The metal support exemplified in FIG. 4 could alternatively have a plastics barrier layer on one or both of its major surfaces, and could be indented or scored to provide hinged portions capable of facilitating wrapping of the support around a body such as a cable splice. Even if the indentations should cause the metal to break when a support is thus wrapped, the plastics coating would tend to remain intact, owing to its flexibility, thus maintaining the hinge connection and the protective function of the support.

It will be understood that the present invention includes a heat-recoverable sleeve liner which is a laminate comprising the aforementioned support member and barrier layer or layers.

We claim:

1. A heat-recoverable closure assembly comprising a heat-recoverable outer sleeve surrounding a body to be enclosed thereby, a support member surrounding the body and within the sleeve which support member has slotted end portions arranged to be capable of forming a tapering transition from the support member to the body, and a flexible thermal barrier layer comprising a flexible foam sheet associated with at least the slotted portions of the support member and bridging the slots thereof; said barrier layer being sufficiently flexible so as not to hinder the tapering of the slotted end portions.

2. A heat-recoverable closure assembly comprising a heat-recoverable outer sleeve surrounding a body to be enclosed thereby, a support member surrounding the body and within the sleeve which support member has slotted end portions arranged to be capable of forming a tapering transition from the support member to the body, and a flexible thermal barrier layer comprising a flexible foam sheet covering substantially all of one major surface of the support member and bridging the slots of the slotted portions thereof; said barrier layer being sufficiently flexible so as not to hinder the tapering of the slotted end portions.

3. An assembly according to claim 1 or 2, further comprising a moisture barrier layer associated with at least the slotted portions of the support member and bridging the slots thereof; said moisture barrier layer being sufficiently flexible so as not to hinder the tapering of the slotted end portions.

4. An assembly according to claim 3, wherein the moisture barrier layer comprises a metallic layer carried on a flexible carrier member.

5. An assembly according to claim 3, wherein the thermal barrier layer, the support member and the moisture barrier layer are laminated together.

6. An assembly according to claim 1 or 2, wherein the support member is thermoplastic and the thermal barrier layer covers substantially the whole surface of the support member which is outermost as installed around the body.

7. An assembly according to claim 1 or 2, wherein the thermal barrier and the support member are laminated together.

8. An assembly according to claim 1 or 2, wherein the support member is a flexible metal sheet.

9. An assembly according to claim 1 or 2, wherein the support member comprises hinged segments of substantially rigid metal.

10. As assembly according to claim 1 or 2, wherein the thermal barrier layer is outside the support member as installed around the body.

11. An assembly according to claim 1 or 2, wherein the thermal barrier layer is inside the support member as installed around the body.

* * * * *